(12) United States Patent
Matsushita et al.

(10) Patent No.: US 12,722,548 B2
(45) Date of Patent: Sep. 1, 2026

(54) BACK SURFACE MEMBER FOR SEAT PAD AND METHOD FOR MANUFACTURING THE SAME

(71) Applicants: TOYOTA BOSHOKU KABUSHIKI KAISHA, Aichi-ken (JP); TOYOTSU VEHITECS CO., LTD., Mie-ken (JP)

(72) Inventors: Shota Matsushita, Toyota (JP); Ryo Iwasawa, Kanagawa-ken (JP); Futoshi Takahashi, Kanagawa-ken (JP); Masaya Kadota, Mie-ken (JP)

(73) Assignees: TOYOTA BOSHOKU KABUSHIKI KAISHA, Aichi-Ken (JP); TOYOTSU VEHITECS CO., LTD., Mie-Ken (JP)

( * ) Notice: Subject to any disclaimer, the term of this patent is extended or adjusted under 35 U.S.C. 154(b) by 212 days.

(21) Appl. No.: 18/421,497

(22) Filed: Jan. 24, 2024

(65) Prior Publication Data

US 2024/0262271 A1 Aug. 8, 2024

(30) Foreign Application Priority Data

Feb. 3, 2023 (JP) ................................ 2023-015114

(51) Int. Cl.
*B60N 2/68* (2006.01)
*B60N 2/70* (2006.01)

(52) U.S. Cl.
CPC .............. *B60N 2/686* (2013.01); *B60N 2/70* (2013.01)

(58) Field of Classification Search
CPC ................................ B60N 2/70; B60N 2/686
See application file for complete search history.

(56) References Cited

U.S. PATENT DOCUMENTS 4,643,480 A * 2/1987 Morita .................... B60N 2/70
297/226

FOREIGN PATENT DOCUMENTS

| | | | | | |
|---|---|---|---|---|---|
| JP | 2011-143746 | | | 7/2011 | |
| JP | 2014019071 | A | * | 2/2014 | |
| JP | 5667859 | | | 2/2015 | |
| JP | 2016215969 | A | * | 12/2016 | .......... B60N 2/6009 |
| JP | 2017051479 | A | * | 3/2017 | |
| JP | 2018-127068 | | | 8/2018 | |
| JP | 2019024534 | A | * | 2/2019 | |

OTHER PUBLICATIONS

Japan Office Action issued in Japan Patent Application No. 2023-15114, dated May 26, 2026, together with English translation thereof.

* cited by examiner

*Primary Examiner* — Anthony D Barfield
(74) *Attorney, Agent, or Firm* — Greenblum & Bernstein, P.L.C.

(57) ABSTRACT

A back surface member placed on the back surface of a seat pad, which is a seat's cushioning material. The back surface member is formed into a three-dimensional shape by covering a plurality of pieces on a mold having a three-dimensional shape corresponding to the shape of the back surface of the seat pad, and connecting the edge of pieces by adhesive or welding.

3 Claims, 6 Drawing Sheets

BACK SURFACE MEMBER FOR SEAT PAD AND METHOD FOR MANUFACTURING THE SAME

CROSS-REFERENCE TO RELATED APPLICATIONS

This application claims priority to Japanese patent application serial number 2023-15114, filed Feb. 3, 2023, which is hereby incorporated herein by reference in its entirety for all purposes.

BACKGROUND

This disclosure relates to a back surface member for a seat pad and method for manufacturing the same.

Conventionally, seat pads used as cushioning material in vehicle seats are made of soft urethane foam molded products. Such seat pads are formed as an integrally molded product by placing a cloth-like back surface member on the cavity surface of a foam mold having a three-dimensionally shaped cavity, injecting the raw material, urethane foam resin material, and forming the foam under heat. The back surface member is placed on the back surface of the seat pad, which is the opposite side of the seat surface on which the occupant sits. The seat pad is assembled so that the back surface member is in contact with the seat frame, which is the seat framework. The back surface member prevents the seat pad from directly contacting the seat frame, thus eliminating cracks that can occur when subjected to localized forces. In addition, the back surface member prevents the generation of abnormal noise caused by abrasion and friction. These functions increase the durability of the seat pad.

When the back surface member is placed on the cavity surface of a foam mold having a three-dimensionally shaped cavity, it is desirable to have a three-dimensional shape along the cavity surface. As described in a prior disclosure, a method of cutting multiple pieces from a sheet-like original fabric and connecting each piece by sewing was often adopted to approach a three-dimensional shape along the cavity surface. In other disclosure, a single sheet cut from a sheet-like original fabric is heat-pressed to form a three-dimensional shape along the cavity surface.

In the back surface member described above, if the number of pieces is increased to bring the material closer to a three-dimensional shape, the man-hours required for cutting and sewing each piece increases, resulting in poor productivity. In addition, in the method for heat-pressing a single sheet, since a single sheet is cut from a sheet of original fabric, the efficiency of placing the cutting die is low, resulting in a low yield of raw material and higher costs.

SUMMARY

According to an aspect of the present disclosure, a back surface member that is placed on the back surface of a seat pad, which is a cushioning material of a seat. The back surface member is formed into a three-dimensional shape by being covered a plurality of pieces on a mold with a three-dimensional shape corresponding to the shape of the back surface of the seat pad, then connecting the edge of pieces by adhesive or welding.

Therefore, the productivity is better than that of making a three-dimensional shape corresponding to the shape of the back surface of the seat pad by connecting a plurality of pieces by sewing. In addition, the yield of original fabric is better, and the cost increase can be suppressed compared to forming a single sheet cut from a sheet of original fabric into a three-dimensional shape corresponding to the rear side of the back pad by heat press forming.

BRIEF DESCRIPTION OF THE DRAWINGS

FIG. 2 shows only the back pad.

DETAILED DESCRIPTION

FIGS. 1-6 illustrate a back surface member of a seat pad and a method for manufacturing the back surface member. In the following description, the explanation regarding the direction shall be based on each of the directions of up, down, front, rear, left, and right shown in each figure. Each direction of up, down, front, rear, left, and right are defined based on a vehicle seat 1 when the vehicle seat 1 is mounted on a vehicle floor F.

Figure 1:
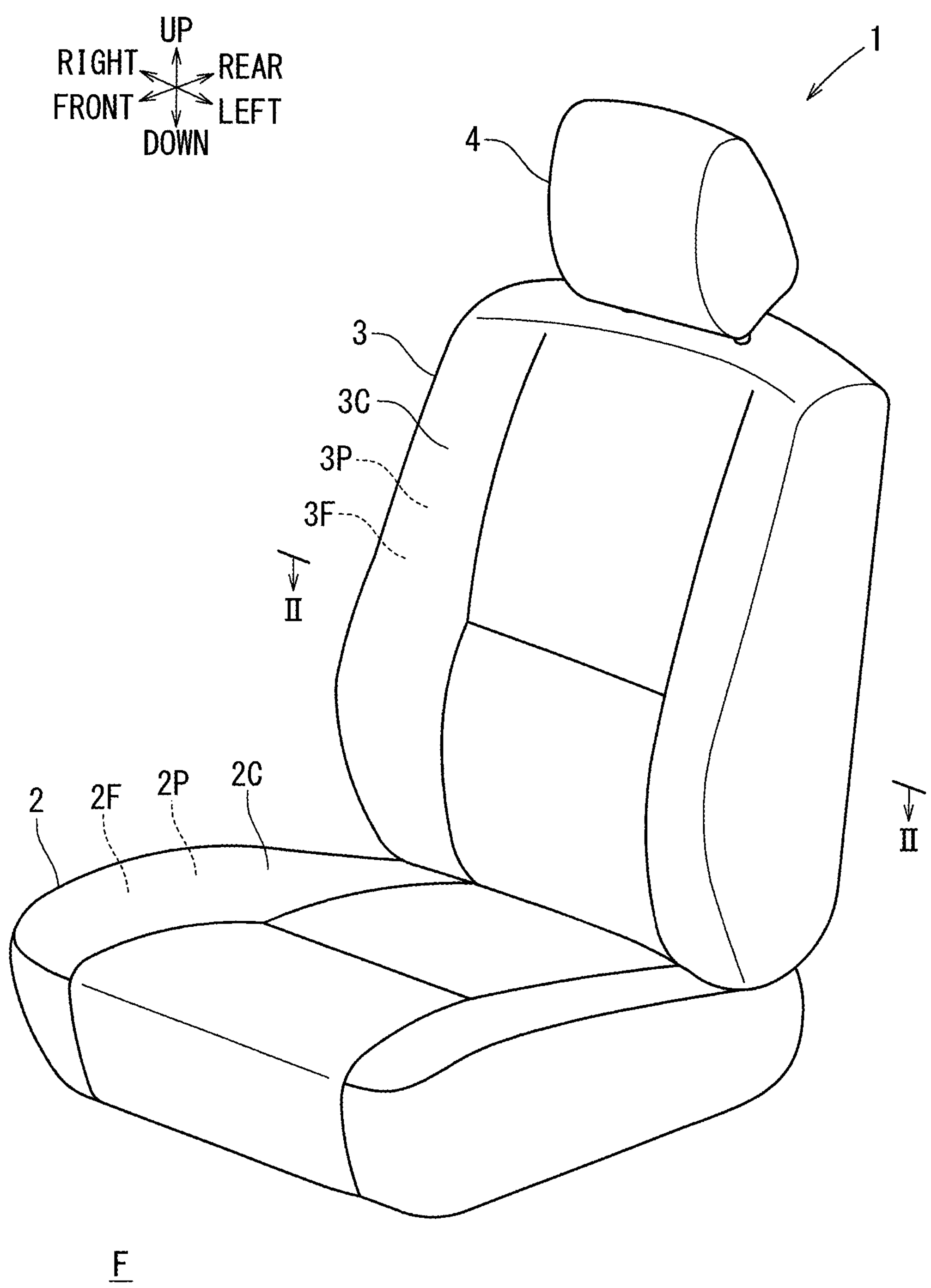
FIG. 1 is a perspective view of a vehicle seat with a back pad in which a back surface member of an embodiment of the present disclosure is placed.

As shown in FIG. 1, the vehicle seat 1 has a seat cushion 2, a seat back 3, and a headrest 4. The seat cushion 2 supports the buttocks and thighs of a seated occupant. The seat back 3 supports the waist and back of the seated occupant. The headrest 4 supports the head of the seated occupant. The seat cushion 2 has a cushion frame 2F, a cushion pad 2P, and a cushion cover 2C. The cushion frame 2F forms the framework. The cushion pad 2P is a cushioning material placed over the cushion frame 2F. The cushion cover 2C is a cover material covering the cushion pad 2P. The cushion pad 2P is an elastic material formed by formed urethane resin. The outline of the cushion pad 2P defines the outline of the seat cushion 2. The seat back 3 has a back frame 3F, a back pad 3P as a cushion material, and a back cover 3C as a cover material. The back frame 3F forms the framework. The back pad 3P is placed over the back frame 3F. The back cover 3C covers the back pad 3P. The back pad 3P is an elastic body formed by formed urethane resin. The outline of the back pad 3P defines the outline of the seat back 3. The back pad 3P corresponds to the “seat pad” in the claims.

Figure 2:
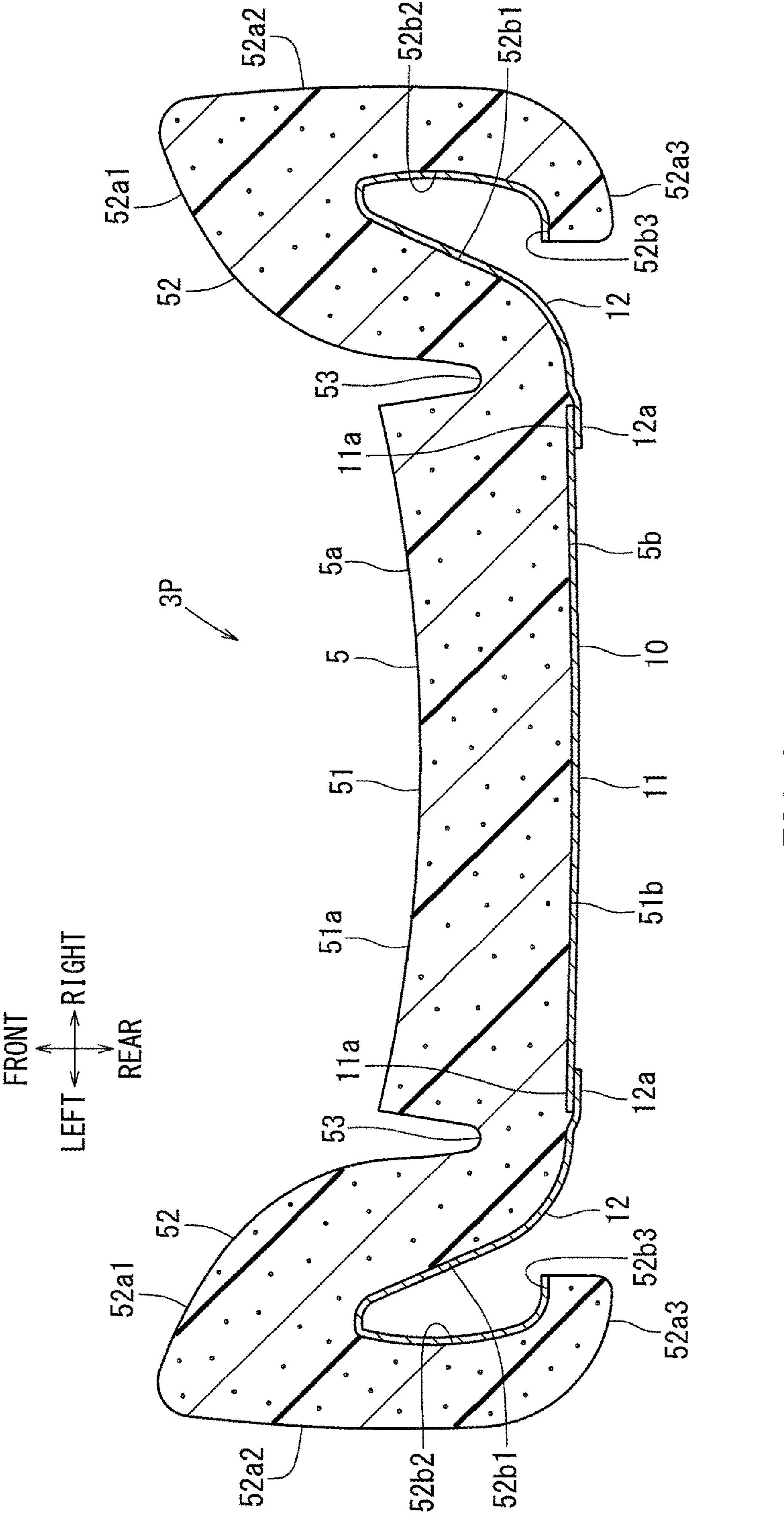
FIG. 2 is a cross-sectional view of the seat of FIG. 1 taken along line II-II.

As shown in FIGS. 1 and 2, the back pad 3P has a foamed resin part 5 and a back surface member 10. The foamed resin part 5 is formed by foam molding of formed urethane resin raw material. The back surface member 10 is made of non-woven fabric and is arranged on the rear surface of the foamed resin part 5. The foamed resin part 5 has a main part 51 at the center portion in the left-right direction and side parts 52 on both the right and left sides across the main part 51. A groove 53 opening toward the front is formed between the main part 51 and each side part 52. The main part 51 has a front surface part 51*a*, which is a side facing toward the person seated, and a rear surface part 51*b*, which is a surface facing away from the person seated. Both the front surface part 51*a* and the rear surface part 51*b* are surfaces that are perpendicular to the front-back direction. Each side part 52 has a front part **52*a*1, a side part 52*a*2, and a folded part 52*a*3. The front part 52*a*1 protrudes toward the front direction. The side part 52*a*2 extends from the left end and right end, which is the front-most part of the front surface 52*a*, toward the rear direction while the rear end side curves toward the center of the left-right direction. The folded part 52*a*3 extends from the rear end of the side part 52*a*2 toward the center of the left-right direction. Each side part 52 has a first rear part 52*b*1, a second rear part 52*b*2, and a third rear part 52*b*3. The first rear part 52*b*1 extends parallel to the front part 52*a*1. The second rear part 52*b*2 extends parallel to the side part 52*a*2. The third rear part 52*b*3 extends parallel to the folded part 52*a*3. The front surface part 51*a* of the main part 51 and each front part 52*a*1, each side part 52*a*2, and each folded part 52*a*3 of each side part 52 are connected by each groove 53 to form a front surface 5*a*, which is the front side of the foamed resin part 5. The front-most part of each front part 52*a*1 of each side part 52 projects forward from the front surface part 51*a* of the main part 51 by about the thickness of the main part 51 in the front-back direction. The rear surface part 51*b* of the main part 51, each first rear part 52*b*1, each second rear part 52*b*2, and each third rear part 52*b*3 continuously constitute a rear surface 5*b*, which is the rear side of the foamed resin part 5**.

As shown in FIG. 2, the back surface member 10 is arranged on the rear surface **5*b* of the foamed resin part 5. The back surface member 10 is made of polyester resin, polyethylene resin, polypropylene resin, or a combination thereof. When molding the foamed resin part 5 with a foaming mold, the back surface member 10 is placed in the cavity of the foaming mold. Then, at the same time as the foamed resin part 5 is molded, a part of the raw material of the foamed resin part 5 permeates the back surface member 10 and then solidified, so that the foamed resin part 5 and the back surface member 10 are integrated. The back surface member 10 has a main piece 11 and a sub piece 12. The main piece 11 corresponds to the rear surface part 51*b* of the main part 51 of the foamed resin part 5. The sub piece 12 corresponds to each first rear part 52*b*1, each second rear part 52*b*2 and each third rear part 52*b*3 of each side part 52 of the foamed resin part 5. The back surface member 10 is formed by integrally welding the right and left edges 11*a* of the main piece 11 and a center side edge 12*a* of the sub piece 12 on the center side in the right and left directions in an overlapped state. The right and left edges 11*a* and the center side edge 12*a* are overlapped. The dimensions of the overlapped portion are between about 10 to 30 mm inclusively. The main piece 11 corresponds to the "center piece, piece", and the sub piece 12 corresponds to the "side piece, piece" of the claims. Also, each right and left edge 11*a* and each center side edge 12*a*** correspond to the "edge" in the claims, respectively.

Figure 3:
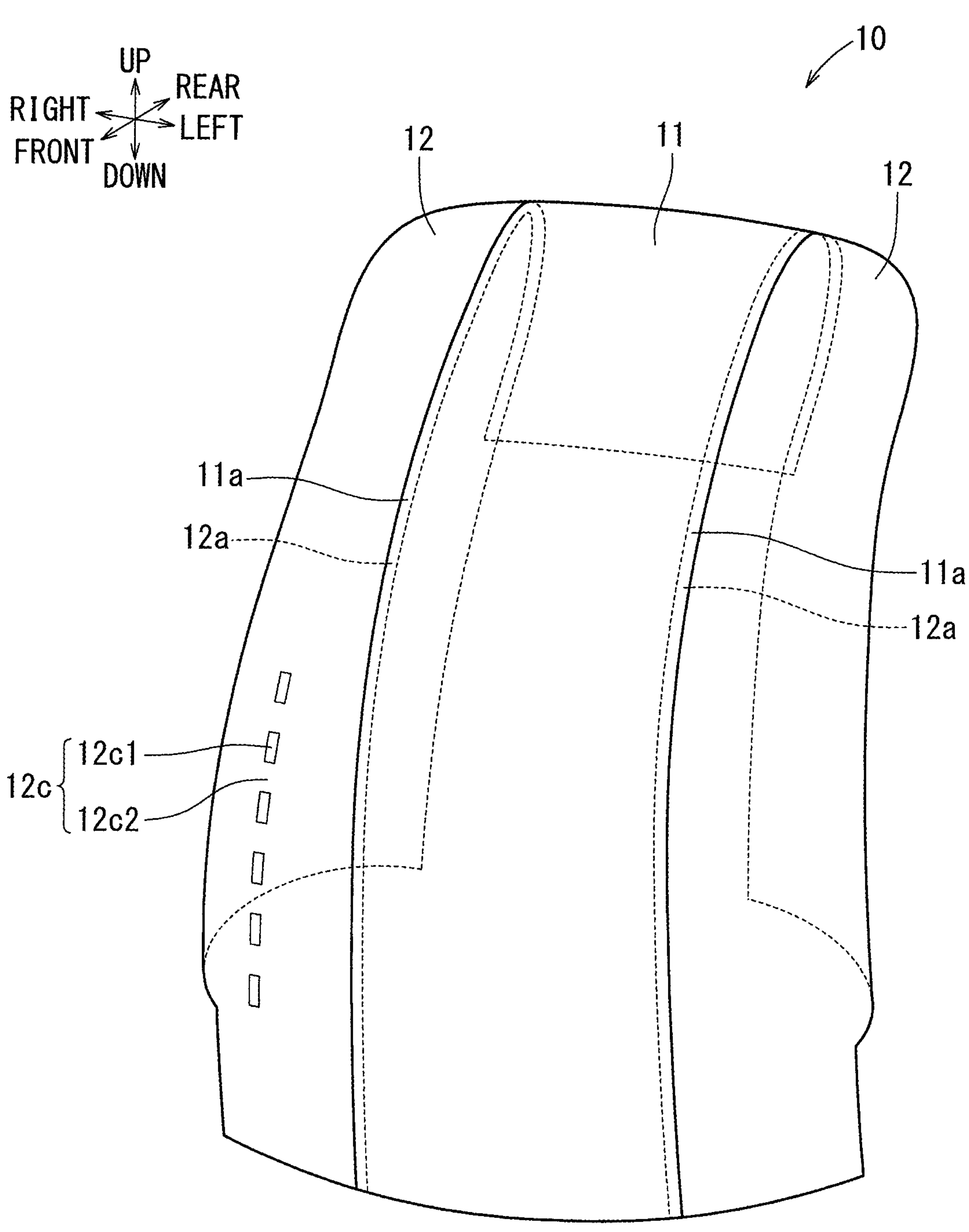
FIG. 3 is a perspective view of the back surface member according to the embodiment of FIG. 1.
Figure 4:
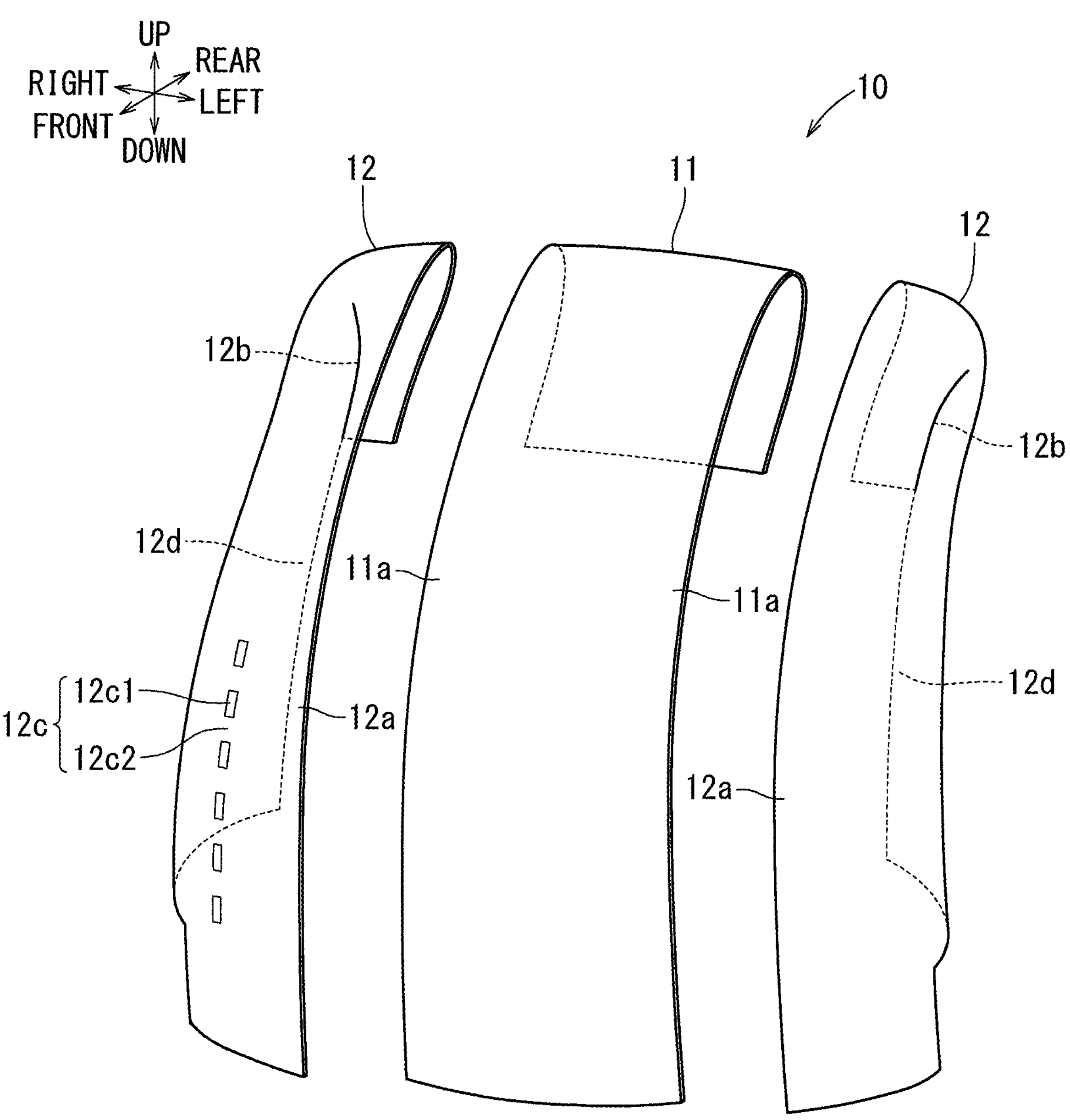
FIG. 4 is an exploded perspective view of the back surface member according to the embodiment of FIG. 1.

A method for manufacturing the back surface member 10 is described based on FIGS. 3 to 6. As shown in FIGS. 3 and 4, the back surface member 10 is formed by overlapping and heat-welding the right and left edges **11*a* of the main piece 11 onto the center side edges 12*a* of each of the right and left pairs of sub pieces 12 to form a single piece. The main piece 11 is a strip-shaped member cut from an original nonwoven fabric. The sub piece 12 is cut from an original nonwoven fabric and then partially sewn at a sewing part 12*b*. In this way, the back surface member 10 is formed into a vessel shape opening toward the center in the left-right direction. In the right sub piece 12, perforations 12*c* are formed extending downward from the center in the vertical direction. The perforations 12*c* make it easier to break the sub piece 12 when the airbag (not shown) mounted on the back frame 3F is deployed. For example, the perforation 12*c* can be such that the length of a slit portion 12*c*1 is between about 10 to 30 mm inclusively, and the length of a connecting portion 12*c*2 is between about 3 to 10 mm inclusively. However, it can be set not only to the above length, as long as the airbag can deploy the sub piece 12. If the airbags are mounted on both the right and left sides of the back frame 3F, a similar perforation 12*c* is formed on the left sub piece 12. The width of the slit portion 12*c*1 of the perforation 12*c* is narrow. Therefore, when molding the foamed resin part 5 with a foaming mold, a part of the foamed urethane resin raw material that is the raw material of the foamed resin part 5 may enter and leak to the rear side (the back side) of the sub piece 12 or the slit portion 12*c*1 can be prevented from being blocked. Therefore, when molding the foamed resin part 5 with a foaming mold, compared to the case where a hole for deploying the airbag is provided in the sub piece 12, the number of parts that fix and hold the edge of the hole in the foaming mold can be reduced. Further, the number of man-hours for setting the back surface member into the foaming mold on the production line can also be reduced. Furthermore, it is possible to easily prevent a portion of the foamed urethane resin raw material from entering and leaking out to the rear side (the back side) of the sub piece 12. Here, the process of manufacturing the main piece 11 and the sub piece 12** is a first step.

Figure 5:
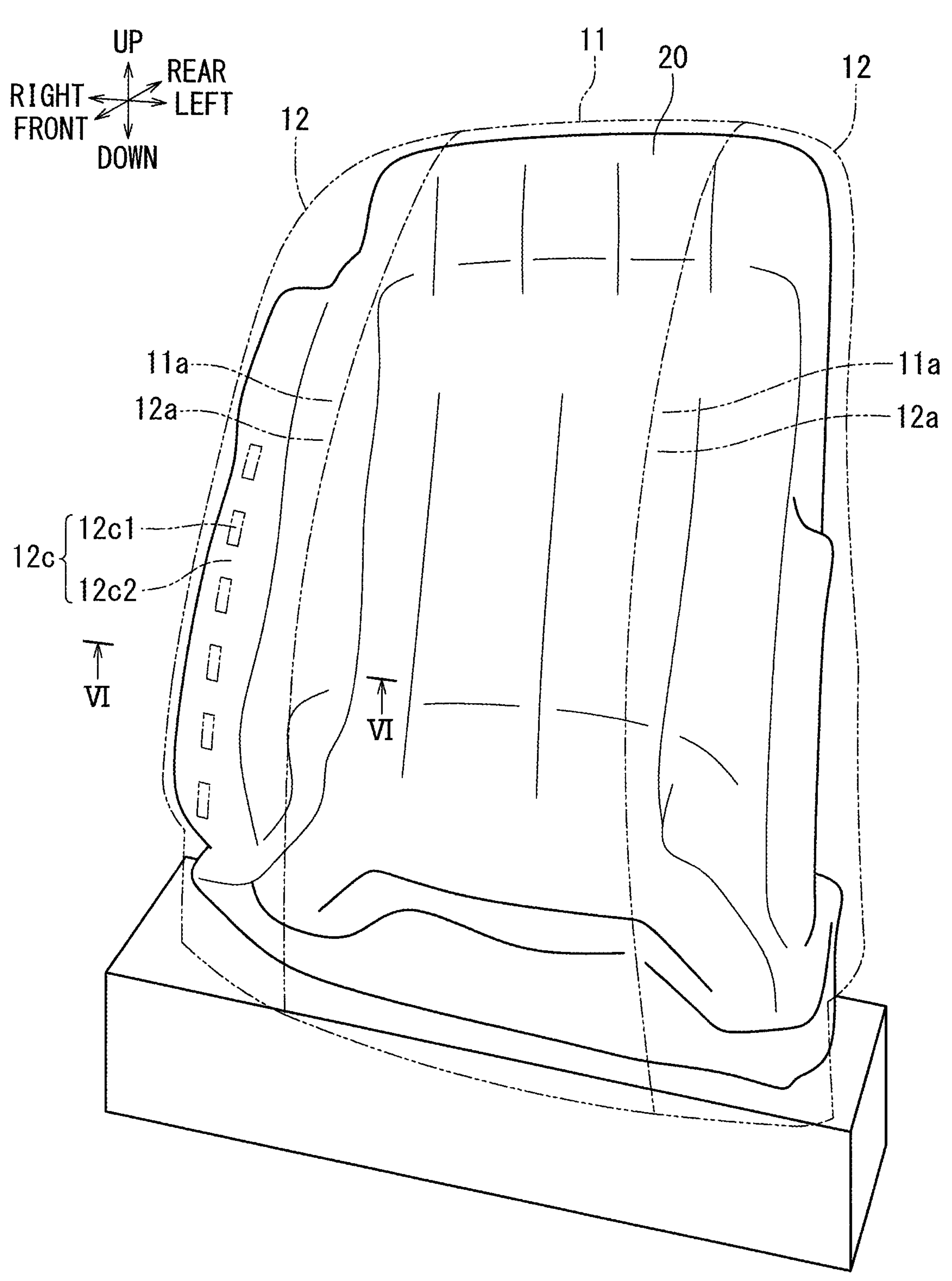
FIG. 5 is a perspective view of a mold for manufacturing the back surface member according to the embodiment of FIG. 1.
Figure 6:
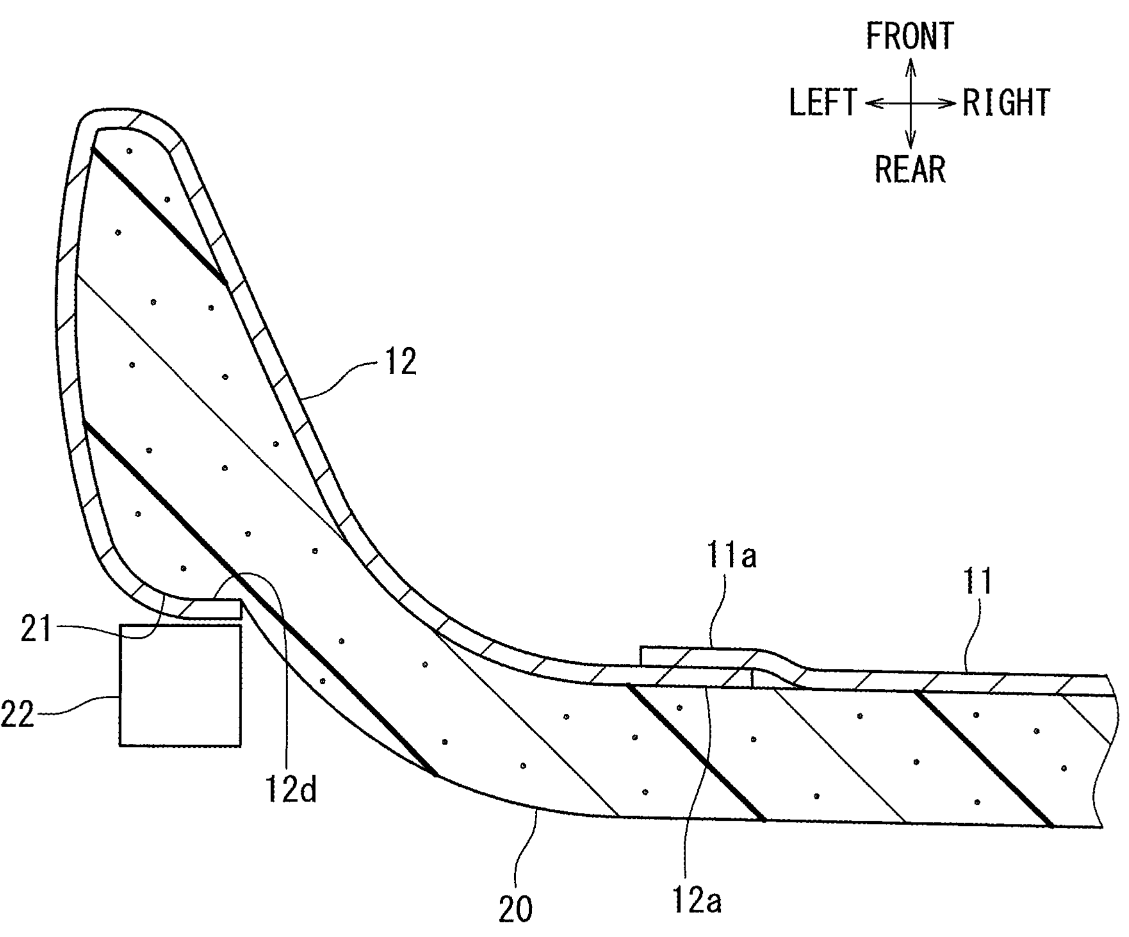
FIG. 6 is a cross-sectional view of FIG. 5 taken along line VI-VI.

As shown in FIGS. 5 and 6, in a following second step, a mold 20 whose surface shape is the rear side shape (the back side shape) of the back pad 3P is covered with the right and left sub pieces 12 and the main piece 1. Then, each right and left edge **11*a* of the main piece 11 is superimposed on each center side edge 12*a* of the right and left sub pieces 12. As shown in FIG. 6, the mold 20 is provided with a folded part support surface 21 at the right and left edges. The folded part support surface 21 corresponds to each third rear part 52*b*3 in the side part 52 of the foamed resin part 5. An outer edge 12*d*, which is the opposite end of the center side edge 12*a* in the right and left sub pieces 12, is fixed by pressing from the rear by a pressure block 22 in a state where it is applied from the rear side to the folded part support surface 21. In this state, each overlapped center side edge 12*a* and each right and left edge 11*a* is pressed by a heating member (not shown) to heat and melt them. Then, they are cooled and solidified for welding by releasing the heating member. During this welding process, a film-type hot melt adhesive may be placed between each center edge 12*a* and each right and left edge 11*a*. By using hot melt adhesive, the heating temperature can be lowered, and the heating time can be shortened. Since each outer edge 12*d* is fixed so that it does not shift position with respect to the folded part support surface 21, the process of trimming the outer circumference after welding can be omitted. Thus, a back surface member 10 in which the main piece 11 and the right and left sub pieces 12** are integrated is manufactured.

With the back surface member 10 placed in the cavity of the foaming mold (not shown), the formed urethane resin raw material is injected into the cavity and foam cured. This forms the back pad 3P integrated with the back surface member 10.

The embodiment configured as described above has the following effects. The back surface member 10 having a main piece 11 and right and left sub pieces 12 is covered on a mold 20 having the shape of the rear surface of the back pad 3P, then a main piece 11 and right and left sub pieces 12 are connected by welding at each center side edge **12*a* and each right and left edge 11*a*. Thus, the back surface member 10 is formed into a three-dimensional shape corresponding to the rear surface of the back pad 3P. Therefore, it is more productive than connecting the main piece 11 and the right and left sub pieces 12 by sewing to form a three-dimensional shape corresponding to the rear surface of the back pad 3P. In addition, the yield of original fabric is better, and the cost increase can be suppressed compared to forming a single sheet cut from a sheet of original fabric into a three-dimensional shape corresponding to the rear side of the back pad 3**P by heat press forming.

The main piece 11 is the piece of the center part in the left-right direction (the seat width direction). The right and left sub pieces 12 are the pieces of the left-side part and right-side part that sandwich the center part. In the cross section in the right and left direction, the piece can be divided into a center part and both side parts that protrude significantly forward from the center part. Therefore, it is possible to make the three-dimensional shape of the back pad 3P more similar to the rear surface of the back pad 3P. Thus, the back surface member 10 can be placed more accurately on the rear surface of the back pad 3P.

Further, perforations 12*c* are provided in the right-side sub piece 12 to facilitate rupture of the sub piece 12 when the airbag mounted on the back frame 3F deploys. Therefore, there is no need to provide holes in the sub piece 12 to facilitate rupture of the sub piece 12 when the airbag deploys. When the foamed resin part 5 is molded with formed urethane resin, the number of parts to fix and hold the hole edge to the foaming mold can be reduced. The man-hours required to set the back surface member into the foaming mold on the production line can also be reduced. In addition, leakage of formed urethane resin raw material from the holes in the back surface member 10 placed on the cavity surface of the foaming mold can be inhibited to the rear side (the back side) of the back surface member 10. Thus, the amount of formed urethane resin raw material used is reduced.

Although specific embodiments have been described above, the present disclosure is not limited to their appearance and configuration, and various changes, additions, and deletions are possible to the extent that they do not alter the gist of the invention. For example, the following are examples.

In the above embodiment, in the first step, the sub piece 12 is cut from the nonwoven original fabric and then partially sewn at the sewing part 12*b* to form a vessel shape opening toward the center in the left-right direction. However, instead of sewing, it may be welded or bonded to form a vessel shape that opens toward the center in the left-right direction. Depending on the shape of the rear side of the back pad 3P, it may be made without sewing, welding, bonding, etc.

In the above embodiment, when overlapping each center side edge 12*a* and each right and left edge 11*a*, each right and left edge 11*a* was placed in front of each center side edge 12*a*, but this is not limited thereto. Each center side edge 12*a* may be placed on the front side of each right and left edge 11*a*.

In the above embodiment, the present disclosure is applied to the back pad 3P of a vehicle seat 1, but it can also be applied to the cushion pad 2P. Furthermore, it may be applied to back pads and cushion pads in seats for airplanes, ships, rail vehicles, and the like.

Another aspect of the present disclosure is the back surface member for a seat pad, wherein the plurality of pieces includes at least a center piece (a main piece) in the seat width direction and side pieces (sub pieces) at both ends of the main piece in the seat width direction.

According to the above aspect, a piece can be divided into a center piece and two side pieces by large concavities and convexities that protrude forward relative to the center part in the cross-section in the seat width direction. Therefore, it is possible to make the three-dimensional shape of the back surface member more similar to the rear surface of the back pad. Thus, the back surface member can be placed more accurately on the rear surface of the back pad.

Another aspect of the present disclosure is the back surface member for a seat pad, wherein the seat pad is a molded formed urethane resin. Perforations are provided in some part of the sub piece to facilitate rupture of the sub piece when the airbag mounted inside of the seat deploys.

According to the above aspect, there is no need to provide holes in the sub piece to facilitate rupture of the sub piece when the airbag deploys. Therefore, the number of parts to fix and hold the hole edges to the foaming mold can be reduced. The man-hours required to set the back surface member into the foaming mold on the production line can also be reduced. In addition, when the foamed resin part is molded with formed urethane resin, leakage of formed urethane resin raw material from the holes in the back surface member placed on the cavity surface of the foaming mold can be inhibited to the rear side of the back surface member. Thus, the amount of formed urethane resin raw material used is reduced.

Another aspect of the present disclosure is a method for manufacturing a back surface member for a seat pad. A three-dimensional shape of the back surface of the seat pad is formed by combing a plurality of pieces. The combined pieces are then covered on a mold, which has a three-dimensional shape corresponding to the shape of the back surface of the seat pad. Finally, the edge portions of the pieces are connected together by adhesion or welding to form the three-dimensional shape.

According to the above aspect, it is more productive than connecting the pieces by sewing to form a three-dimensional shape corresponding to the shape of the rear surface of the back pad. In addition, the yield of original fabric is better, and the cost increase can be suppressed compared to forming a single sheet cut from a sheet of original fabric into a three-dimensional shape corresponding to the shape of the rear side of the seat pad by heat press forming.

Another aspect of the present disclosure is a method for manufacturing a back surface member for a seat pad, in which the plurality of pieces includes at least a center piece in the seat width direction and side pieces on both sides of the center piece in the seat width direction.

Accordingly, a piece can be divided into a center piece and two side pieces by large concavities and convexities that protrude forward relatively to the center part in the cross-section in the seat width direction. Therefore, it is possible to make the three-dimensional shape of the back surface member more similar to the rear surface of the back pad. Thus, the back surface member can be placed more accurately on the rear surface of the back pad.

Another aspect of the present disclosure is a method for manufacturing a back surface member for a seat pad, in which the seat pad is a molded urethane foam resin. Perforations are provided in some part of the side sub piece to facilitate rupture of the sub piece when the airbag mounted inside of the seat deploys.

According to the above aspect, there is no need to provide holes in the sub piece to facilitate rupture of the sub piece when the airbag deploys. Therefore, when the foamed resin part is molded with formed urethane resin in the second step, leakage of formed urethane resin raw material from the holes in the back surface member placed on the cavity surface of the foaming mold can be inhibited to the rear side of the back surface member. Thus, the amount of formed urethane resin raw material used is reduced.

The numerous examples described above in detail with reference to the attached drawings are intended to be representative of the present disclosure and are thus non-limiting embodiments. The detailed description is intended to instruct a person of skill in the art to make, use, and/or practice various aspects of the present teachings, and thus does not limit the scope of the disclosure in any manner. Furthermore, each of the additional features and teachings disclosed above may be applied and/or used separately or with other features and teachings in any combination thereof, to provide a back surface member for a seat pad and/or methods of making and using the same.

What is claimed is:

1. A back surface member for a seat pad, wherein a plurality of pieces, which is covered on a mold having a three-dimensional shape correspond to a back surface of the seat pad, are connected by adhesion or welding at the edge portion of the plurality of pieces, wherein the plurality of pieces includes at least one center piece at the center portion in the seat width direction and a plurality of side pieces at both ends of the center piece in the seat width direction, wherein a plurality of perforations is arranged on a part of the side piece, and wherein each of the plurality of perforations has a length of a slit portion between about 10 to 30 mm and a length of a connecting portion between about 3 to 10 mm inclusively.

2. The back surface member according to claim 1, wherein the seat pad is a molded formed urethane resin.

3. The back surface member according to claim 1, wherein the at least one center piece is configured for integrally welding a center side edge of the plurality of side pieces in an overlapped state.

* * * * *